United States Patent [19]

Hayashi

[11] 4,444,373
[45] Apr. 24, 1984

[54] FUEL TANK MOUNTING ASSEMBLY FOR MOTOR VEHICLE

[75] Inventor: Isao Hayashi, Yokohama, Japan
[73] Assignee: Nissan Motor Company, Limited, Yokohama, Japan
[21] Appl. No.: 363,150
[22] Filed: Mar. 29, 1982
[30] Foreign Application Priority Data
  May 22, 1981 [JP] Japan .................................. 56-76754
[51] Int. Cl.³ ........................................... F16M 13/00
[52] U.S. Cl. ..................................... 248/544; 280/5 A
[58] Field of Search .......................... 248/544, 1, 200; 280/5 A, 5 R; 137/354, 350

[56] References Cited
U.S. PATENT DOCUMENTS
3,697,093 10/1972 Cadiou ................................. 280/5 A
4,093,254 6/1978 Ezaki ................................... 280/5 A
4,369,981 1/1983 Chiba et al. ......................... 280/5 A Primary Examiner—Ramon S. Britts
Assistant Examiner—Ramon O. Ramirez
Attorney, Agent, or Firm—Schwartz, Jeffery, Schwaab, Mack, Blumenthal & Koch

[57] ABSTRACT

A fuel tank mounting assembly for a motor vehicle, wherein the fuel tank is fixedly mounted, in a suspended manner, underneath a floor panel of the vehicle body. Support means is provided for temporarily supporting the fuel tank until the latter is securely mounted in position. Such support means may comprise lugs provided at the fuel tank side and slots provided at the vehicle body side, the lugs and slots being adapted for engagement with each other to provide the temporary support for the fuel tank.

10 Claims, 4 Drawing Figures

FIG. I
PRIOR ART
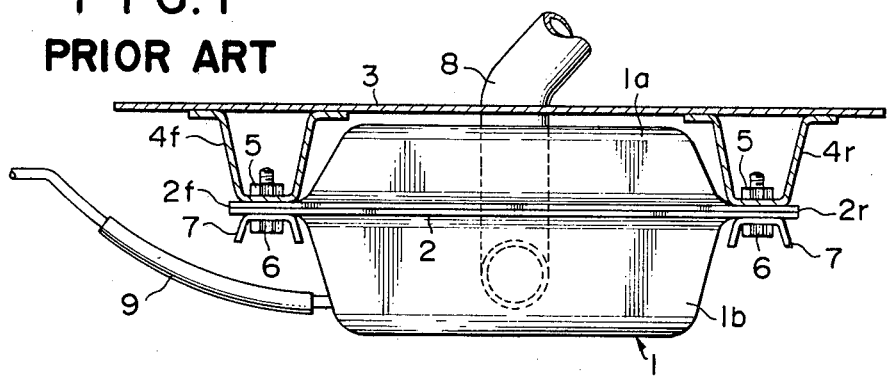
FIG. 3
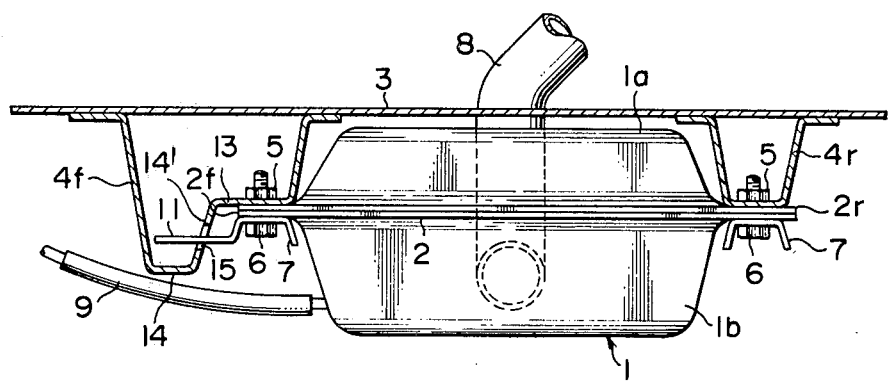
FIG. 4
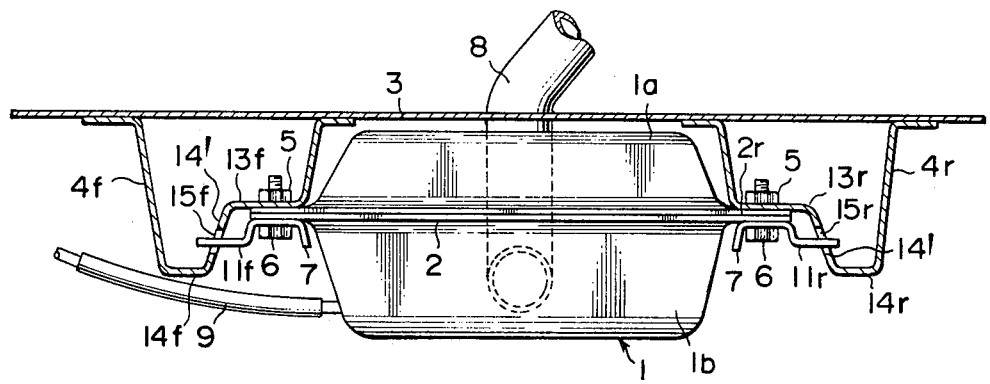

FUEL TANK MOUNTING ASSEMBLY FOR MOTOR VEHICLE

BACKGROUND OF THE INVENTION

1. Field of the Invention

The present invention relates to a fuel tank mounting assembly for a motor vehicle, and more particularly it pertains to an improved structure of such an assembly wherein the fuel tank is securely mounted in position underneath a floor panel of the motor vehicle.

2. Description of the Prior Art

There has heretofore been proposed a fuel tank mounting assembly for a motor vehicle such as shown in FIG. 1, wherein a fuel tank 1 provided with a flange portion 2 extending laterally thereof is constituted by an upper tank half 1a and a lower tank half 1b which are joined together in a fluid-tight manner. The tank halves 1a and 1b are provided with flanges 2f and 2r, respectively, which are adapted, when the tank halves are joined together as mentioned above, to form the flange portion 2 of the fuel tank 1. Although not shown, the flanges 2f and 2r are formed with through-apertures for inserting screw bolts 6 therethrough. A pair of mount members 4f and 4r are fixedly attached to the lower face of a rear floor panel 3 of the motor vehicle body in such a manner as to extend widthwise thereof in substantially parallel spaced relationship to each other. The mount members 4f and 4r are adapted, when the fuel tank 1 is to be mounted in position, to be engaged by the flange portion 2 of the fuel tank 1. Further, the mount members 4f and 4r are formed with through-apertures (not shown) at positions aligned with the through-apertures of the flange portion 2 and have nuts welded or otherwise secured thereto in alignment with the through-apertures thereof.

In the mounting operation, the fuel tank 1 is held by a worker so that the flange portion 2 thereof is disposed in engagement with the mount members 4f and 4r and the through-apertures formed in the flange portion are positioned in alignment with the through-apertures formed in the mount members; and with the fuel tank 1 being thus held, the bolts 6 are subsequently threaded into the nuts 5, whereby the fuel tank 1 is fixedly mounted, in a suspended manner, onto the mount members 4f and 4r underneath the rear floor panel 3. Designated at 7 are patch members serving to distribute the concentration of stress which tends to occur in the flange portion 2 when the bolts 6 are tightened with respect to the nuts 5. Indicated at 8 is a fuel supply conduit leading to the fuel tank 1, and shown at 9 is a tube for supplying fuel to the engine of the motor vehicle.

With the foregoing conventional arrangement, however, great difficulties are encountered in an attempt to mount the fuel tank 1 in position, due to the fact that while tightening the bolts 6, the worker has to bear the entire weight of the fuel tank 1 which is rather bulky and heavy, since the latter remains mechanically unsupported until it is fixedly mounted by means of the bolts 6.

SUMMARY OF THE INVENTION

Accordingly, it is an object of the present invention to provide a fuel tank assembly for a motor vehicle, which is so designed as to avoid the aforementioned difficulties with the prior art.

Another object of the present invention is to provide a fuel mounting assembly for a motor vehicle, which is provided with means for eliminating the necessity for a worker to bear the entire weight of the fuel tank until the latter is fixedly mounted in position as is the case with the prior art.

Briefly stated, according to the present invention, means is provided for temporarily supporting at least part of the weight of the fuel tank until the latter is fixedly mounted in position. Such support means may comprise first means provided at the fuel tank side and second means provided at the vehicle body side, the first and second means being adapted for engagement with each other to provide the temporary support for the fuel tank, thereby greatly facilitating the fuel tank mounting operation.

BRIEF DESCRIPTION OF THE DRAWINGS

Other objects, features and advantages of the present invention will become apparent from the ensuing description taken in conjunction with the accompanying drawings.

FIG. 1 is a side view, partly in section, illustrating a conventional fuel tank mounting assembly for a motor vehicle.

FIG. 3 is a side view, partly in section, showing the assembly of FIG. 2 as viewed in the direction indicated by the arrow A of FIG. 2.

FIG. 4 is a view similar to FIG. 3, illustrating the fuel tank mounting assembly according to another embodiment of the present invention.

DETAILED DESCRIPTION OF THE PREFERRED EMBODIMENTS

Figure 2:
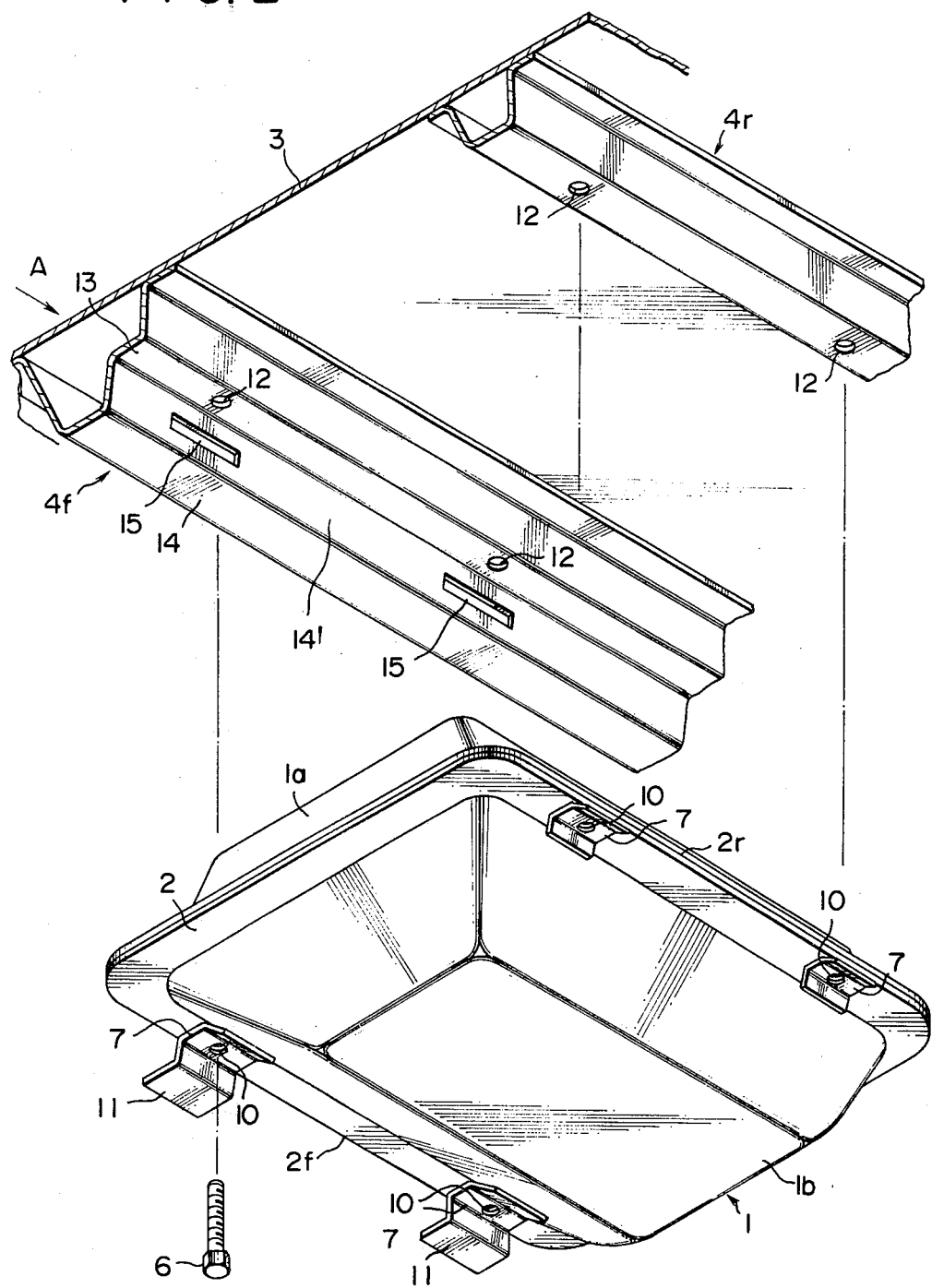
FIG. 2 is an exploded perspective view illustrating the fuel tank mounting assembly according to an embodiment of the present invention.

Referring now FIGS. 2 and 3, there is shown the fuel tank mounting assembly according to an embodiment of the present invention, wherein a fuel tank 1 is composed of an upper tank half 1a and a lower tank half 1b which are respectively provided with flanges 2f and 2r adapted, when disposed in engagement with each other, to form a flange portion 2 of the fuel tank 1. Each of the flanges 2f and 2r is formed with a predetermined number of through-apertures 10 for inserting screw bolts 6 therethrough. Patch members 7, each of which is formed with a through-aperture for inserting a screw bolt therethrough, are welded or otherwise secured to the lower face of the flange portion 2 with the through-apertures thereof being disposed in alignment with the through-apertures 10, thereby distributing the concentration of stress which tends to occur when the bolts 6 are tightly clamped. According to this embodiment, it is to be particularly noted that each of the patch members 7 is integrally provided with lugs 11 which extend from the fore edge of the flange portion 2 longitudinally of the vehicle body. A pair of, front and rear, mount members 4f and 4r are fixedly attached to the lower face of a rear floor panel 3 in such a manner as to extend widthwise of the vehicle body, the opposite ends of the mount members 4f and 4r being connected to side members (not shown). The rear mount member 4r is configured in a U-shape so as to define, when attached to the rear floor panel 3, a closed cross-section with the panel, and has through-apertures 12 formed in the flat bottom wall thereof at positions corresponding to the aforementioned through-apertures 10. Further, nuts 5 are welded or otherwise secured to the upper face of the flat bottom wall of the rear mount member 4r in alignment with the through-apertures 12. The nuts 5 are adapted for threaded engagement with the screw bolts 6. The front mount member 4f is configured in such a shape as to define, when attached to the rear floor panel 3, a closed cross-section with the panel, and it is provided, at the side opposite to the rear mount member 4r, with a substantially flat ledge portion 13 which is adapted, when the fuel tank 1 is mounted in position, to be engaged with the flange portion 2 of fuel tank 1. The front mount member 4f is also provided with a downwardly extending portion 14 of an approximately U-shaped cross-section which has a side wall 14' contiguous with the ledge portion 13. Through-apertures 12 are formed in the ledge portion 13 in alignment with the through-apertures, and nuts 5 are also welded or otherwise secured to the upper face of the ledge portion 13. Furthermore, slots 15 are formed in the side wall 14' of the downwardly extending portion 14 in predetermined spaced relationship with each other, the slots 15 being adapted to be engaged with the lugs 11 when the fuel tank 1 is to be mounted in position.

With the foregoing construction embodying this invention, when the fuel tank 1 is to be mounted onto the vehicle body, the lugs 11 provided on the fuel tank 1 are first inserted into the slots 15 of the front mount member 4f, and then the fuel tank 1 is lifted up at the rear edge thereof until the flange portion 2 thereof is disposed into abutment with the mount members 4f and 4r. While the fuel tank 1 is thus being lifted up, the lugs 11 remain engaged with the slots 15, so that the fuel tank 1 is supported at the front edge thereof by the front mount member with the through-apertures 12 being disposed in alignment with the through-apertures 10. Thus, when the fuel tank 1 is lifted up at the rear edge thereof by the worker, the weight of the fuel tank 1 is partially borne at the front edge thereof by the front mount member 4f so that the weight to be borne by the worker is correspondingly lessened. Subsequently, the flange 2r of the fuel tank 1 is disposed into abutment with the lower face of the rear mount member 4r in such a manner that the through-apertures 10 of the fuel tank 1 are aligned with the through-apertures 12 of the mount members 4f and 4r, and then the screw bolts 6 are threaded into the nuts 5 through the apertures 10 and 12. During this phase of the mounting operation, it is to be particularly noted that the fuel tank 1 is temporarily supported at the front edge thereof with respect to the vehicle body through the engagement of the engaging pieces 11 with the slots 15. Under such a condition, the through-apertures 10 formed in the front flange 2f have been aligned with the through-apertures 12 formed in the ledge portion 13 of the front mount member 4f as mentioned above. Thus, by threading the screw bolts 6 into the nuts 5 through the apertures 10 and 12, the fuel tank 1 is completely secured at the front edge thereof to the front mount member 4f and hence to the vehicle body.

Referring to FIG. 4, there is shown another embodiment of the present invention which is similar in basic construction to the aforementioned embodiment but different from the latter in the following points, According to this embodiment, lugs 11f and 11r extending in opposite directions are integrally provided on patch members 7 which are attached to the flanges 2f and 2r of a fuel tank 1, and front and rear mount members 4f and 4r, which are fixedly attached to a rear floor panel 3 in the same manner as in the first-mentioned embodiment, are provided with ledge portions 13f, 13r and downwardly extending portions 14f, 14r, respectively. The downwardly extending portions 14f and 14r are configured in an approximately U-shaped cross-section each having side wall 14' which is contiguous with the associated one of the ledge portions 13f and 13r. In the side walls 14' are respectively formed slots 15f and 15r which are adapted for engagement with the aforementioned lugs 11f and 11r, respectively, as in the first-described embodiment.

In the mounting operation, the lugs 11f provided at the front side of the fuel tank 1 are first deeply inserted into the slots 15f of the front mount member 4r; then the fuel tank 1 is lifted up at the rear edge thereof by the worker; and thereafter, the lugs 11r provided at the rear side of the fuel tank 1 are inserted into the slots 15r formed in the rear mount member 4r. Obviously, the engagement of the lugs 11f and 11r with the slots 15f and 15r results in the fuel tank 1 being temporarily supported with respect to the front and rear mount members 4f and 4r secured to the vehicle body. Thus, now there is no necessity for the worker to bear the weight of the fuel tank. Subsequently, the through-apertures 10 of the flanges 2f and 2r are aligned with the through-apertures 12 of the front and rear mount members 4f and 4r, and then the screw bolts 6 are threaded into the nuts 5 through the thus aligned apertures. In this way, the fuel tank 1 is completely secured, in a suspended manner, with respect to the vehicle body.

As will be appreciated, with the arrangement according to the second embodiment, there is no necessity for the fuel tank 1 to be held by the worker at all when the screw bolts 6 are threaded into the nuts 5. Thus, the fuel tank mounting procedure in this embodiment is greatly facilitated as compared with that in the first embodiment. Another important advantage resulting from this embodiment is such that even if there occurs such a situation that some of the screw bolts 6 are loosened and removed due to vibrations of the vehicle body, for example, the fuel tank 1 can be prevented from falling off the vehicle body by virtue of the engagement between the lugs 11f, 11r and the slots 15f, 15r, whereby protection is assured against the danger of the fuel tank 1 being dismantled by accident.

From the foregoing discussion, it will be appreciated that according to the present invention, during the mounting operation, the weight of the fuel tank is at least partially supported at the vehicle body side so that the load or weight to be borne by the worker is correspondingly decreased, whereby the fuel tank mounting operation is greatly facilitated, thus resulting in a highly enhanced operation efficiency.

Although the present invention has been illustrated and described in conjunction with specific embodiments thereof, it is to be understood that many changes and modifications thereto will become possible without departing from the spirit and scope of the invention. For example, although the lugs have been illustrated as being integral with the patch members, it is possible that the lugs may be separately prepared and securely attached to the patch members. It is also possible that the lugs may be provided either at any other locations of the fuel tank flange or flanges or on the outer wall of the fuel tank per se. To sum up, it is only required that the lugs be disposed at the fuel tank side in such a manner as to extend laterally of the fuel tank and that the slots with which the lugs are engaged be provided at the vehicle body side. Furthermore, although in the foregoing embodiments, the lugs were disposed in engagement with the slots to provide the provisional support for the fuel tank, it is also possible to achieve such support by utilizing, instead of the slots, recesses, flanges or the like which can be engaged with the lugs in a similar manner. Still furthermore, although in the aforementioned embodiments, the mount members were employed as means for supporting the fuel tank in a suspended manner, it is also possible that such means may be constituted by part of the rear floor panel per se without using the mount members. The bolts and nuts serving as clamping means may be substituted with clips or any other suitable means. It goes without saying that the terms "front" and "rear" used herein are employed just for the sake of description and should not be interpreted in any sense to limit the disposition or orientation of the fuel tank and associated supporting/mounting structure.

What is claimed is:

1. A fuel tank mounting assembly for a motor vehicle, having a body with a floor panel and fastening means for mounting a fuel tank in a suspended manner underneath the floor panel of the body, said assembly comprising:

support means for temporarily supporting at least part of the weight of said fuel tank before said fastening means are engaged to fixedly mount said fuel tank in position, said support means comprising first means provided on the body of said motor vehicle for bearing at least part of the weight of said fuel tank, and second means provided on said fuel tank for engaging said first means to provide the temporary support for said fuel tank when said fuel tank is to be mounted in position.

2. An assembly according to claim 1, further comprising a first and a second mount member which are fixedly attached to said floor panel of the vehicle body in substantially parallel spaced relationship with each other, wherein said fastening means fixedly mounts said fuel tank onto said first and second mount members.

3. An assembly according to claim 2, wherein said first means of said support means is disposed on at least one of said first and second mount members.

4. An assembly according to claim 3, wherein:
   said first means of said support means comprises slots formed in said at least one mount member; and
   said second means of said support means comprises lugs fixedly attached to said fuel tank in such a manner as to extend laterally thereof, said lugs being adapted to be disposed in engagement with said slots to provide the temporary support for said fuel tank.

5. An assembly according to claim 3, wherein:
   said first means of said support means comprises recesses formed in said at least one mount member; and
   said second means of said support means comprises lugs fixedly attached to said fuel tank in such a manner as to extend laterally thereof, said lugs being adapted to be in engagement with said recesses to provide the temporary support for said fuel tank.

6. An assembly according to claim 3, wherein:
   said first means of said support means comprises flanges provided on said at least one mount member; and
   said second means of said support means comprises lugs fixedly attached to said fuel tank in such a manner as to extend laterally thereof, said lugs being adapted to be disposed in engagement with said flanges to provide the temporary support for said fuel tank.

7. An assembly according to claim 2, wherein said fuel tank is provided with a flange portion adapted to be disposed in engagement with said first and second mount members, and said second means of said support means is fixedly attached to said flange portion.

8. An assembly according to claim 7, wherein at least one of said first and second mount members includes a ledge portion having a substantially flat bottom wall portion adapted for engagement with said flange portion of the fuel tank and a downwardly extending portion of an approximately U-shaped cross-section having a side wall portion contiguous with said ledge portion, said side wall portion being provided with said first means of said support means.

9. An assembly according to claim 1, wherein said floor panel is provided with means for enabling said fuel tank to be mounted directly onto said floor panel.

10. An assembly according to claim 1, wherein said fastening means includes nuts, bolts, bolt holes formed in said fuel tank, and a fuel tank mount member having bolt holes, wherein said support means aligns said fuel tank bolt holes with said attachment member bolt holes to facilitate engagement of said nuts and bolts.

* * * * *